(12) United States Patent
Satzler

(10) Patent No.: US 6,530,442 B1
(45) Date of Patent: *Mar. 11, 2003

(54) METHOD OF SYNCHRONIZING FIRST AND SECOND STEERING ARRANGEMENTS

(75) Inventor: Ronnie L. Satzler, Princeville, IL (US)

(73) Assignee: Caterpillar Inc, Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 599 days.

(21) Appl. No.: 08/987,977

(22) Filed: Dec. 10, 1997

(51) Int. Cl.[7] .............................. B62D 11/06; B62D 5/06
(52) U.S. Cl. ...................................... 180/6.26; 180/6.44
(58) Field of Search .......................... 180/6.24, 6.26, 180/6.28, 6.3, 6.32, 6.34, 6.36, 6.38, 6.4, 6.44

(56) References Cited

U.S. PATENT DOCUMENTS

| | | | |
|---|---|---|---|
| 3,612,199 A | * 10/1971 | Vissers | 180/6.32 |
| 4,449,598 A | * 5/1984 | Hones et al. | 180/6.5 |
| 4,519,275 A | 5/1985 | Maruyama et al. | 74/866 |
| 4,914,592 A | * 4/1990 | Callahan et al. | 701/41 |
| 5,258,912 A | * 11/1993 | Ghoneim et al. | 701/42 |
| 5,473,541 A | 12/1995 | Ishino et al. | 364/424.07 |
| 5,477,455 A | 12/1995 | Ishino et al. | 364/424.07 |
| 5,535,840 A | 7/1996 | Ishino et al. | 180/6.44 |
| 5,611,405 A | 3/1997 | Ishino et al. | 180/6.44 |

FOREIGN PATENT DOCUMENTS

| | | |
|---|---|---|
| GB | 2308344 A | 8/1996 |
| GB | 2310177 A | 2/1997 |

* cited by examiner

Primary Examiner—Kevin Hurley
(74) Attorney, Agent, or Firm—Jeff L Myers

(57) ABSTRACT

A method of synchronizing first and second steering arrangements is provided to control the steering of a machine. The first steering arrangement has steerable wheels that turn in response to a steer input. The second steering arrangement has non-steerable wheels or drive units in which steering is provided by changing the relative speed of right and left drive units. An electronic controller senses and controls the angle of steer of each of the first and second steering arrangements in order to synchronize their respective outputs. If the second steering arrangement cannot provide the needed angle of steer, an independently controlled brake is proportionally applied to the appropriate drive unit in order to assist the second steering arrangement.

13 Claims, 3 Drawing Sheets

METHOD OF SYNCHRONIZING FIRST AND SECOND STEERING ARRANGEMENTS

TECHNICAL FIELD

This invention relates generally to controlling front and rear steering arrangements and more particularly to a method for synchronizing front and rear steering arrangements.

BACKGROUND ART

Various arrangements are known in which front and rear steering arrangements are used to control the steering of a machine. In these known arrangements, the steering has normally been independent of each other. Consequently, it was up to the skill of the operator to control the rate of steering of each of the front and rear steering arrangements. Other systems are known in which one form of steering control is used to steer one end of the vehicle and independently controlled brakes are used to slow one or the other side of the machine on the other end of the machine. Such systems are well known on agricultural machines, such as farm tractors and combines. In these known systems, the one end of the machine is steered by steerable wheels, such as an ackerman type steering and the other end of the machine is steered by slowing down one of the drive wheels relative to the other. This is normally accomplished by the operator selectively applying a brake force through the application of independently controlled brakes.

In machines commonly known as half-track machines, the front wheels are ackerman type steering with the respective wheels being steerable wheels and the rear portion of the machine has continuous tracks on each side. In these types of machines, steering of the front wheels forces the tracked portions to follow. Since it is well known that continuous tracks resists being turned, a greater steer input must be made through the ackerman steer to overcome the resistance. Normally, a portion of the steer input is lost due to the front steerable wheels sliding laterally. If the surface being traversed is soft a greater portion of the steer input is lost due to the steerable wheels sliding laterally. In order to aid in the steering of half-tracked machines, independently controlled brakes are used to slow the appropriate track with respect to the other track. The amount of independent brake effort is based on the skill of the operator.

The present invention is directed to overcoming one or more of the problems as set forth above.

Disclosure of the Invention

In one aspect of the subject invention, a method is provided to synchronize the steering between steerable wheels on one end of a machine and non-steerable drive units on the other end of the machine. The method includes the steps of sensing the angle of the first steering arrangement, sensing the relative difference between the speeds of the drive units of the second steering arrangement, selecting a desired steer input, directing a steer input command to one of the first and second steering arrangements, calculating the angle of steer required for the other steering arrangement to match the angle of steer of the one steering arrangement, and directing a command signal to the other steering arrangement to provide a steer angle that matches the steer angle of the one steering arrangement.

BEST MODE FOR CARRYING OUT THE INVENTION

Figure 1:
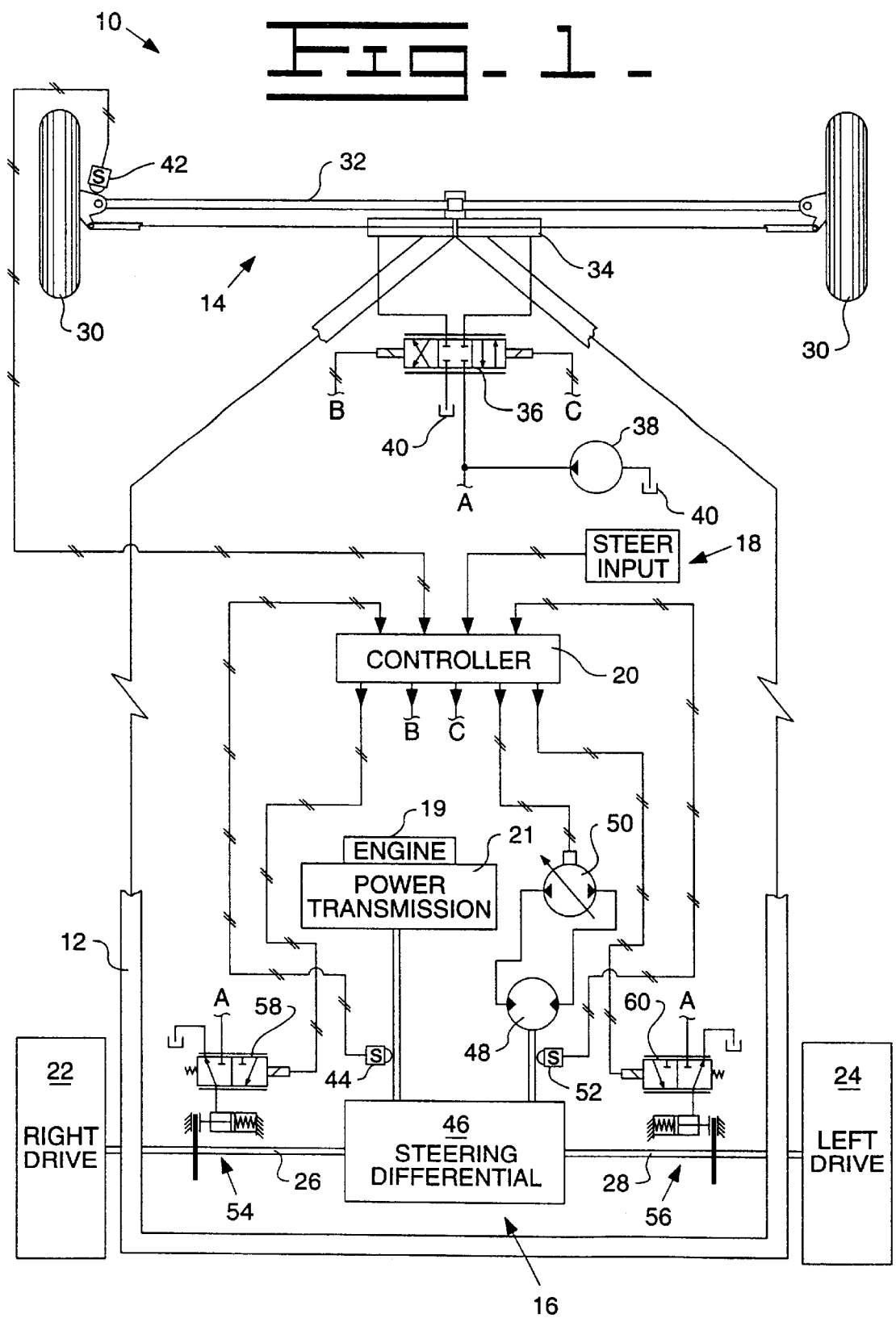
FIG. 1 is a partial diagrammatic and partial schematic representation of a machine incorporating an embodiment of the subject invention.

Referring to the drawings and more particularly to FIG. 1, a machine 10 is illustrated and includes a frame 12, first and second steering arrangement 14,16, a steer input arrangement 18, an engine 19, an electronic controller 20, and a power transmission 21. The power transmission 21 is operatively connected to right and left drive units 22,24 through respective output shafts 26,28.

The first steering arrangement 14 includes steerable wheels 30 spaced from one another by an axle 32. The axle 32 is connected to the frame 12 and a steering cylinder 34 is disposed between the steerable wheels 30 and operative to cause the respective steerable wheels 30 to angle with respect to the frame 12. This type of steering is normally referred to as ackerman steering. Even though two wheels 30 are illustrated, it is recognized that a single steerable wheel could be connected to the frame 12 without departing from the essence of the subject invention.

A steering control valve 36 is operatively disposed between the steering cylinder 34 and a source of pressurized fluid 38, such as a hydraulic pump, that receives fluid from a reservoir 40. The steering control valve 36 of the subject invention is a three position proportional control valve that is movable between a centered, flow blocking position and first and second operative positions. The steering control valve 36 is movable from its centered position in response to receipt of an electrical signal from the electronic controller 20. When the steering control valve 36 is moved towards its first operative position, the steerable wheels 30 are angled in one direction and when the steering control valve 36 is moved towards its second operative position, the steerable wheels 30 are angled in the opposite direction.

A sensor 42 is disposed relative to the axle 32 and one of the steerable wheels 30 and operative to direct an electrical signal representative of the angle of steer to the electronic controller 20.

The steer input arrangement 18 directs an input signal to the controller 20 that is representative of the desired angle of steer required by the operator. The controller 20 directs respective command signals to the steering control valve 36.

A speed sensor 44 is located generally at the output of the power transmission 21 and is operative to direct a signal to the controller 20 that is representative of the speed from the power transmission 21. The controller uses the speed output from the power transmission to calculate the ground speed of the machine 10.

A differential steer mechanism 46 is disposed between the output of the power transmission 21 and the respective output shafts 26,28 and is operative to vary the relative speeds of the respective output shafts 26,28. By varying the relative speeds of the respective output shafts 26,28, the angle of steer is varied. Thus, although non-rotatable, the second steering arrangement can create an angle of steer by varying the respective output shafts 26,28. The differential steer mechanism 46 has a fluid steer motor 48 connected thereto. The steer motor 48 is fluidity connected to a variable displacement pump 50. The displacement of the variable displacement pump 50 is controlled in response to receipt of a signal from the controller 20. The output speed of the steer motor 48 determines the magnitude of the relative difference in speed between the respective output shafts 26,28 and therefore the difference in speed of the right and left drive units 22,24.

A sensor 52 is associated with the output of the fluid steer motor 48 and operative to deliver a signal to the controller 20 that is representative of the speed of the steer motor 48. The controller 20 uses the speed signal from the steer motor 48 to calculate the difference in speed between the output shafts 26,28 and thus determine the angle of steer or turn radius of the machine 10 that is being produced by the differential steer mechanism 46.

A first brake 54 is disposed on the first output shaft 26 and a second brake 56 is disposed on the second output shaft 28. Each of the first and second brakes 54,56 is spring applied and pressure released in response to receipt of pressurized fluid from the source of pressurized fluid 38. Respective brake control valves 58,60 are disposed between the pump 38 and the respective independently controlled brakes 54,56. Each of the brake control valves 58,60 is spring biased to a position at which the pressurized fluid from the pump 38 is blocked and the actuating chamber of the brake is open to the reservoir 40. Each is movable towards a position at which the pump 38 is in fluid communication with the associated one of the brakes 54,56 upon receipt of a signal from the electronic controller 20.

Figure 2:
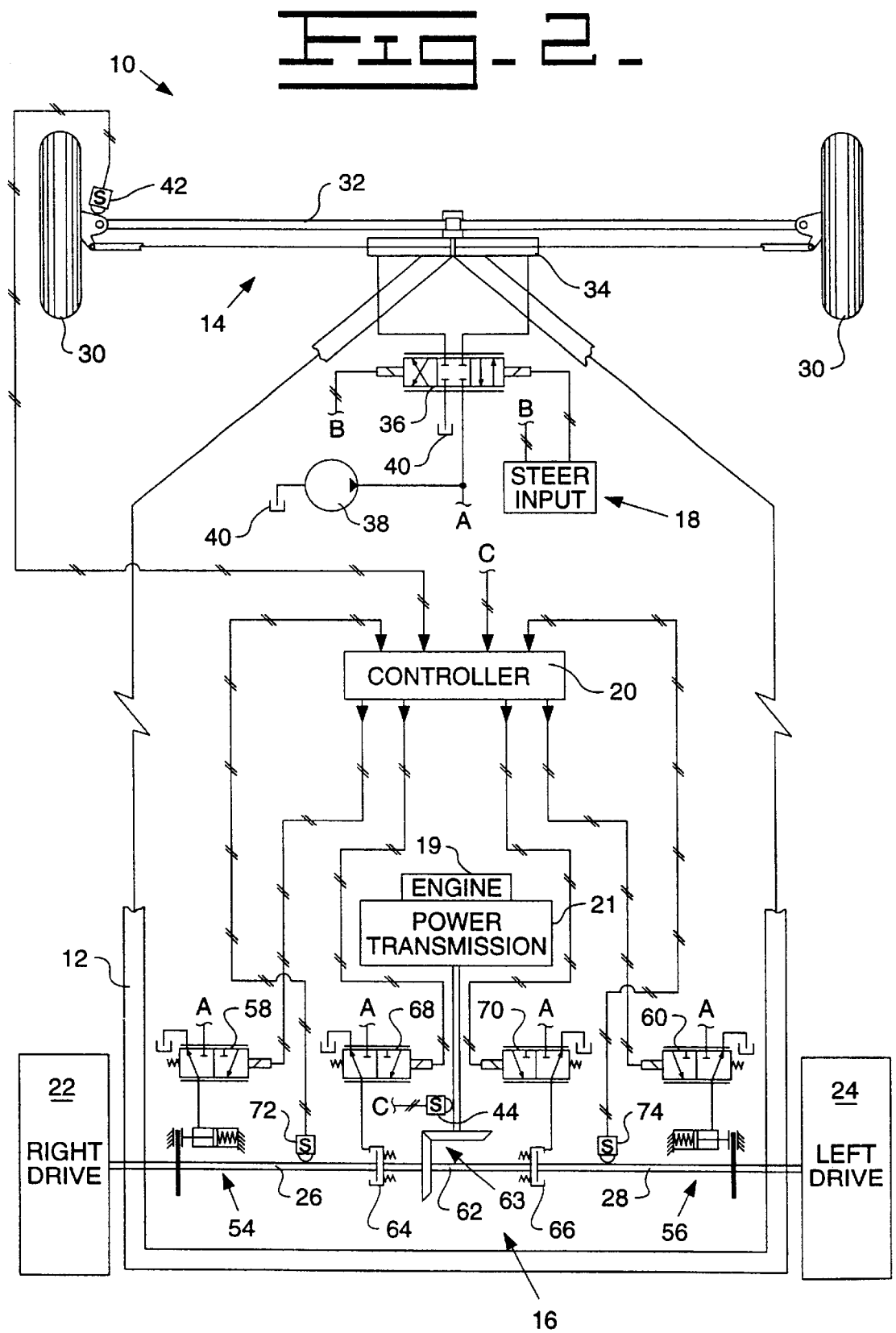
FIG. 2 is a partial diagrammatic and partial schematic representation of a machine incorporating another embodiment of the subject invention.

Referring to FIG. 2, another embodiment of the subject invention is disclosed. Like elements have like element numbers. The first steering arrangement 14 is generally the same as that set forth in FIG. 1. However, in the embodiment of FIG. 2, the steer input arrangement 18 directs desired steer input signals directly to the steering control valve 36.

In the arrangement of FIG. 2, the differential steer mechanism 46 has been removed and the output from the power transmission 21 is connected to a power shaft 62 through a bevel gear arrangement 63. The power shaft 62 is connected to the respective output shafts 26,28 through respective independently controlled clutches 64,66. Each of the clutches 64,66 is spring applied and pressure released. The pump 38 is selectively connected to the respective clutches 64,66 through respective clutch control valves 68,70. Each of the clutch control valves 68,70 is spring biased to a position at which the pressurized fluid from the pump 38 is blocked and the actuating chamber of the clutch is open to the reservoir 40. Each is modulatably movable towards a position at which the pump 38 is in fluid communication with the associated one of the clutches 64,66 upon receipt of a signal from the electronic controller 20. The independently controlled brakes 54,56 are disposed on the associated output shafts 26,28 like that set forth above with respect to FIG. 1.

A sensor 72 senses the speed of the output shaft 26 and directs a signal representative of the speed to the controller 20. Likewise, a sensor 74 senses the speed of the output shaft 28 and directs a signal representative of the speed thereof to the controller 20. The respective clutches 64,66 and the respective brakes 54,56 collectively make up the second steering arrangement 16. The controller 20 monitors the relative difference between the two sensed speeds of the output shafts 26,28 to control the angle of steer established by the second steering arrangement 16.

Figure 3:
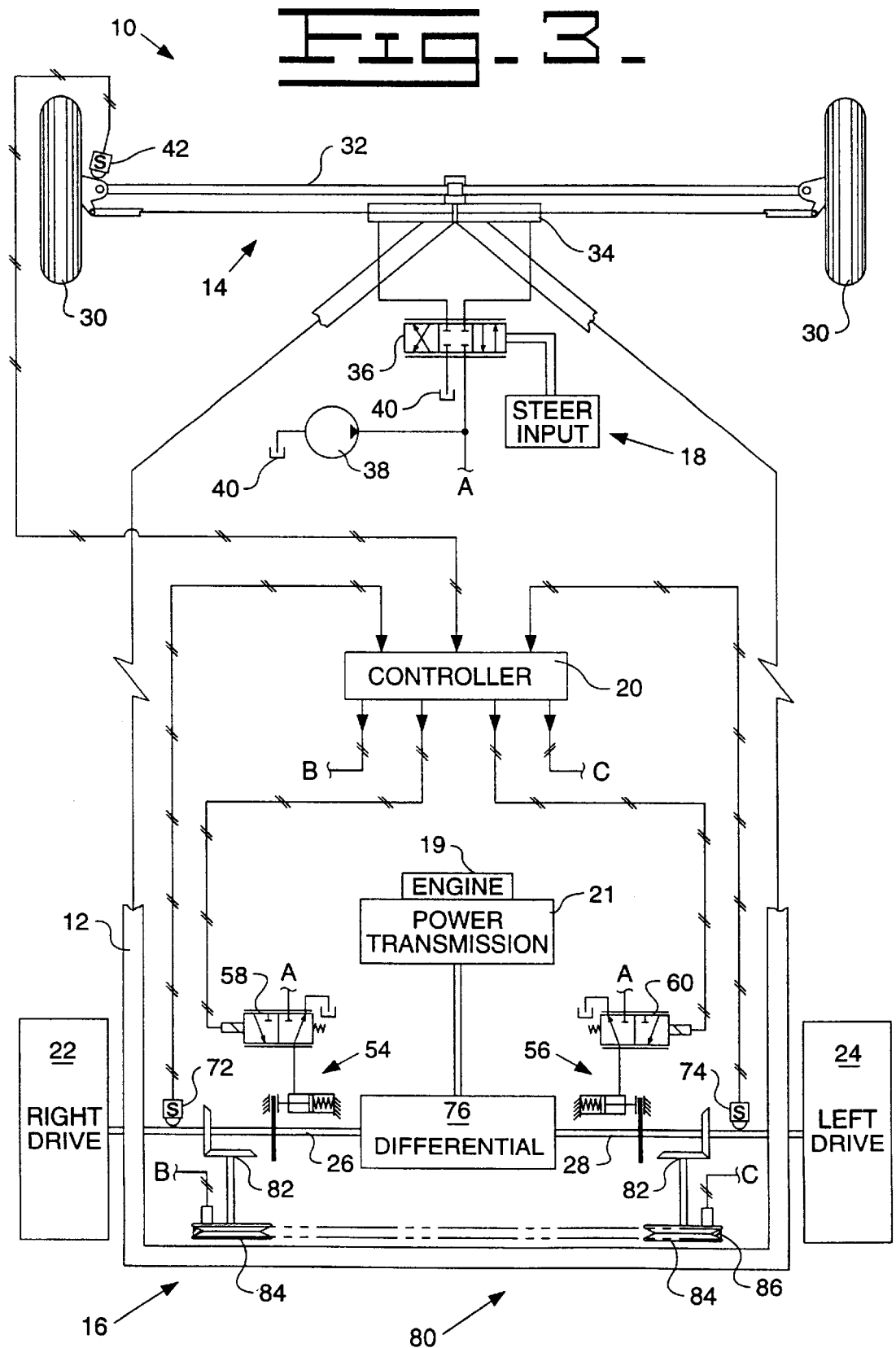
FIG. 3 is a partial diagrammatic and partial schematic representation of a machine incorporating still another embodiment of the subject invention.

Referring to FIG. 3, a third embodiment of the subject invention is disclosed. Like elements have like element numbers. The first steering arrangement 14 is generally the same as that set forth in FIG. 1. However, in the embodiment of FIG. 3, the steer input arrangement 18 directs desired steer input signals directly to the steering control valve 36 through a mechanical connection. The mechanical connection may be in the form of a steering wheel coupled to a well known hand metering unit.

In the arrangement of FIG. 3 as compared to FIG. 1, the differential steering unit 46 has been removed and replaced with a standard differential 76. The output shafts 26,28 extend from the differential 76 and are connected to the associated right and left drive units 22,24. The independently controlled brakes 54,56 are disposed on the associated output shafts 26,28 as set forth with respect to FIG. 1 and are controlled by the controller 20 through the brake control valves 58,60.

A variable ratio belt steering arrangement 80 is provided in FIG. 3 as the second steering arrangement 16. The variable ratio belt steering arrangement 80 includes a bevel gear mechanism 82 connected to each of the respective output shafts 26,28 and it drives associated pulleys 84 that have adjustable pulley diameters. A continuous belt 86 is disposed between and around the adjustable pulleys 80 and serve to provide an infinite number of ratios by varying the size of the respective pulleys. As the size of one pulley is enlarged the size of the other is correspondingly decreased. As the sizes of the pulleys 84 is varied, the relative speed between the respective output shafts 26,28 changes. The magnitude of the relative change speed between the output shafts 26,28 determines the degree of steer of the second steering arrangement 16. The pulley 84 having the smaller diameter is associated with the output shaft 26/28 that is turning faster. The size of the respective pulleys 84 is varied by changing the space between the sides of the pulley. The closer together the sides the larger the diameter of the pulley. With the sides of the pulley 84 close together, the belt 86 runs on a surface of the pulley farther away from the center of rotation. With the sides of the pulley 84 spaced farther apart, the belt 86 runs on a surface of the pulley closer to the center of rotation. The size of the pulleys 84 are controlled in response to receipt of a signal from the controller 20. This signal may be in the form of a mechanical signal, a fluid signal or an electrical signal.

The speed of the respective output shafts 26,28 are sensed by the sensors 72,74 as set forth in FIG. 2 and directed to the controller 20.

It is recognized that various arrangements of first and second steering arrangements 14,16 could be utilized without departing from the essence of the subject invention. For example, even though each of the three embodiments illustrates the steer input 18 being directed to the steer control valve 36 in a different manner, it is recognized that either of the embodiments could use either of the steer inputs illustrated. Likewise, even though each of the embodiments uses a different type of second steering arrangement 16, either embodiment of the second steering arrangement could be used in either of the arrangements set forth in FIGS. 1–3. Furthermore, the steer input could be made to the second steering arrangement 16 and then the first steering arrangement 14 is controlled to match the second steering arrangement. Additionally, the right and left drive units could be wheels or continuous tracks or belts. Likewise the power transmission 21 could be in the form of a mechanism transmission or a fluid drive transmission without departing from the essence of the subject invention.

Industrial Applicability

In the operation of the embodiment set forth in FIG. 1, as long as the machine 10 is not being subjected to a steer input, the machine travels in a straight line. If a steer input is made through the steer input arrangement 18, a steer input signal is directed to the controller 20. The controller 20 directs a command signal to the steering control valve 36 moving it towards the appropriate operative position to steer or angle the steerable wheels 30. As the steerable wheels 30 are being steered, the sensor 42 monitors the angle of steer and directs the information to the controller 20.

Simultaneously, the controller 20 directs a command signal to the variable displacement pump 50 to change its displacement. As a result of the change in displacement of the variable displacement pump 50, the steer motor 48 turns in proportion to the quantity of fluid being received. The speed of the motor 48 determines the relative difference between the speeds of the output shafts 26,28. The controller 20 calculates and synchronizes the angle of steer of each of the first and second steering arrangements 14,16 to control the turning of the machine 10.

By continuously sensing the steer angle of the first steering arrangement 14, the speed sensor 44 and the relative difference between the speeds of the output shafts 26,28, the controller 20 maintains a match between the angle of steer of the first and second steering arrangements 14,16. If one or the other of the first and second steering arrangements 14,16 is too great, the controller 20 directs the appropriate command signal thereto to change its angle of steer to match the other.

If the steer angle required by the steer input arrangement 18 is greater than can be maintained by the second steering arrangement 16, the controller 20 directs a command signal to the appropriate brake 54,56 to proportionally apply the brake to assist the second steering arrangement 16. This permits the machine 10 to negotiate tighter turns under various operating conditions.

In the embodiment of FIG. 2, the steer input command signal is directed to the steering control valve 36 to steer the first steering arrangement 14. The angle of steer is detected and monitored by the sensor 42 and a signal is directed to the controller 20. As a result, the controller 20 directs a command signal to the second steering arrangement 16 so that the second steering arrangement 16 can match the angle of steer set forth by the first steering arrangement 14. In order to provide steering by the second steering arrangement 16, one of the output shafts 26,28 is slowed by progressively disengaging the appropriate clutch 64/68. If a tighter angle of steer is needed, the associated brake 54,56 is progressively applied. By directing the signals from the sensors 72,74, the controller 20 can determine the relative difference between the speeds of the output shafts 26,28 and maintain a synchronization between the magnitude of steering between the first and second steering arrangements 14,16.

In the operation of the embodiment of FIG. 3, the steer input from the steer input arrangement 18 is made directly to the steering control valve 36 by a mechanical input. As set forth with respect to the operation of FIG. 2, the angle of steer is sensed and directed to the controller 20 by the sensor 42. The controller 20 in turn directs a command signal to the second steering arrangement 16 to provide a steer angle to synchronize that of the first steering arrangement 14. In the subject embodiment, the command signal from the controller 20, proportionally changes the relative sizes of the pulleys 84. If it is desired to slow the speed of the right drive relative to the left drive, the size of the pulley 84 on the right side of the machine 10 is increased. That is the effective diameter is increased. Consequently, the pulley 84 on the right side turns at a slower rate as compared to the pulley on the left side. This is true since the pulley 84 on the left side has been decreased in size and the size of the belt 84 has not changed.

As noted with respect to FIG. 1, if a tighter or sharper turn is required that cannot be achieved or maintained by the second steering arrangement 16, the controller 20 directs a command signal to the appropriate independently controlled brake 54/56 and proportionally applies the brake to assist the variable ratio belt steering system 80.

In view of the above, it is readily apparent that the subject arrangement provides a method to synchronize the steering between a first steering arrangement 14 having steerable wheels and a second steering arrangement 16 having non-steerable wheels.

Other aspects, objects and advantages of this invention can be obtained from a study of the drawings, the disclosure and the appended claims.

What is claimed is:

1. A method for synchronizing the steering in a machine between a first steering arrangement having steerable wheels and a second steering arrangement having non-steerable drive units, the method comprising the following steps:
   sensing the angle of the first steering arrangement;
   sensing the relative difference between the speeds of the drive units of the second steering arrangement;
   sensing the speed of the machine relative to the surface being traversed;
   sensing a desired steer input;
   directing a steer input command to one of the first and second steering arrangements;
   calculating the angle of steer required for the other steering arrangement for synchronization with the angle of steer of the one steering arrangement; and
   directing a command signal to the other steering arrangement for synchronization with the steer angle of the one steering arrangement.

2. The method of claim 1 wherein the step of sensing a desired steer input includes the steps of providing a steer input signal to an electronic controller and the electronic controller directing corresponding command signals to the first and second steering arrangements.

3. The method of claim 2 wherein the step of sensing the relative difference between the speeds of the drive units includes the steps of providing a differential steer mechanism having a steer input motor and sensing the speed of the steer input motor.

4. The method of claim 3 including the step of providing an independently controlled brake on each of the respective drive units of the second steering arrangement.

5. The method of claim 4 including the step of directing a command signal to the appropriate one of the independently controlled brakes to assist the steering of the second steering arrangement.

6. The method of claim 5 wherein the first steering arrangement is an ackerman type steering arrangement.

7. The method of claim 1 wherein the first steering arrangement includes a steering control valve and the step of sensing a desired steer input includes the step of directing a command signal to the steering control valve.

8. The method of claim 7 wherein the second steering arrangement includes steering clutches and brakes associated with each of the drive units and the step of sensing the relative difference between the speeds of the drive units includes the steps of controlling the relative slip of the respective clutches and subsequent application of the respective brakes and sensing the speed of each of the drive units.

9. The method of claim 1 wherein the first steering arrangement includes a steering control valve and the step of sensing a desired steer input includes the step of mechanically providing the desired steer input into the steering control valve.

10. The method of claim 9 wherein the second steering arrangement includes a variable ratio belt system having first and second adjustable size sheaves interconnected by a continuous belt and the step of sensing the relative difference between the speeds of the drive units includes the steps of controlling the relative sizes of the sheaves and sensing the speed of the respective drive units.

11. The method of claim 10 including the step of providing independently controlled brakes on each of the respective drive units of the second steering arrangement and controlling application of the respective brakes to aid in the steering of the second steering arrangement.

12. The method of claim 11 including an electronic controller and the step of directing a command signal to the other steering arrangement includes the step of directing appropriate command signals from the electronic controller to control the size of the respective first and second adjustable sheaves.

13. A method for synchronizing the steering in a machine between a first steering arrangement having steerable wheels and a second steering arrangement having non-steerable drive units, the method comprising the following steps:

sensing the angle of the first steering arrangement;

sensing the relative difference between the speeds of the drive units of the second steering arrangement;

sensing the speed of the machine relative to the surface being traversed;

sensing a desired steer input;

directing a steer input command to one of the first and second steering arrangements;

calculating the turning radius required for the other steering arrangement for synchronization with the turning radius of the one steering arrangement; and directing a command signal to the other steering arrangement for synchronization with the turning radius of the one steering arangement.

* * * * *